United States Patent
Capaldi Jr. et al.

(10) Patent No.: US 6,950,883 B1
(45) Date of Patent: Sep. 27, 2005

(54) RING CAPACITY EFFICIENT ARCHITECTURE

(75) Inventors: James Capaldi Jr., Budd Lake, NJ (US); Bruce Gilbert Cortez, Marlboro, NJ (US); Matthew Guardo, Howell, NJ (US)

(73) Assignee: AT&T Corp., New York, NY (US)

( * ) Notice: Subject to any disclaimer, the term of this patent is extended or adjusted under 35 U.S.C. 154(b) by 872 days.

(21) Appl. No.: 09/804,441

(22) Filed: Mar. 12, 2001

(51) Int. Cl.[7] .............................................. G06F 15/16
(52) U.S. Cl. ..................... 709/251; 709/221
(58) Field of Search ............................... 709/223, 224, 709/221; 370/219, 220, 223, 228, 244, 404; 389/2, 9, 17; 174/4

(56) References Cited

U.S. PATENT DOCUMENTS

| | | | |
|---|---|---|---|
| 5,640,512 A * | 6/1997 | Czerwiec ..................... 714/47 |
| 6,111,853 A * | 8/2000 | Goodman .................... 370/224 |
| 6,331,905 B1 * | 12/2001 | Ellinas et al. ................... 398/2 |
| 6,331,906 B1 * | 12/2001 | Sharma et al. ................ 398/48 |
| 6,594,232 B1 * | 7/2003 | Dupont ....................... 370/224 |
| 6,657,952 B1 * | 12/2003 | Shiragaki et al. ........... 370/223 |
| 6,760,302 B1 * | 7/2004 | Ellinas et al. ............... 370/228 |

* cited by examiner

*Primary Examiner*—Mehmet B. Geckil
(74) *Attorney, Agent, or Firm*—Michael Haynes PLC

(57) ABSTRACT

The invention provides methods and systems for provisioning fault-tolerant ring structures that do not necessarily involve fully provisioning all spans of a ring with service capacity. The system allows a plurality of nodes to be connected in a ring structure. The ring structure can allow a ring to be provisioned without a continuous loop of service capacity around all legs of the ring. This postpones or totally avoids the cost of service capacity until a demand requires it. Only protection capacity is required to close the loop, and the decision to add working capacity can be made as warranted. At the same time, this ring structure can retain its fault-tolerant nature and also provide acceptable performance.

20 Claims, 5 Drawing Sheets

100

100

100

200

200

200

RING CAPACITY EFFICIENT ARCHITECTURE

BACKGROUND OF THE INVENTION

1. Field of Invention

This invention relates to methods and systems for providing fault-tolerant ring structures.

2. Description of Related Art

Synchronous optical network (SONET) rings have been used for many years as a survivable transport architecture to support high-reliability services. A SONET ring is a closed loop of nodes supporting a protocol that allows fast rerouting in the event of failures. Currently, SONET rings are provisioned with each node having service line interfaces and protection line interfaces in each direction. SONET requires service and protection resources to be fully provisioned to properly function. Accordingly, new technology is needed for providing fault tolerance with less resource requirements.

SUMMARY OF THE INVENTION

The present invention provides methods and systems for provisioning fault-tolerant ring structures that require less than fully provisioning of all spans of the ring with service capacity.

In various exemplary embodiments, a plurality of nodes can be connected in a ring structure. The ring structure can allow a ring to be provisioned without a continuous loop of service capacity around all legs of the ring. This postpones or totally avoids the cost of service capacity until a demand requires it. Only protection capacity is required to close the loop, and the decision to add working capacity can be made as warranted. At the same time, this ring structure can retain its fault-tolerant nature and also provide acceptable performance.

BRIEF DESCRIPTION OF THE DRAWINGS

The invention is described in detail with reference to the following figures, where like numerals reference like elements, and wherein.

DETAILED DESCRIPTION OF PREFERRED EMBODIMENTS

SONET ring networks have been used for many years as a survivable transport architecture to support high-reliability (fault-tolerant) services. By providing a fault-tolerant protocol that allows for service capacity to be provisioned as needed, transport costs associated with provisioning a SONET network can be considerably reduced.

Figure 1:
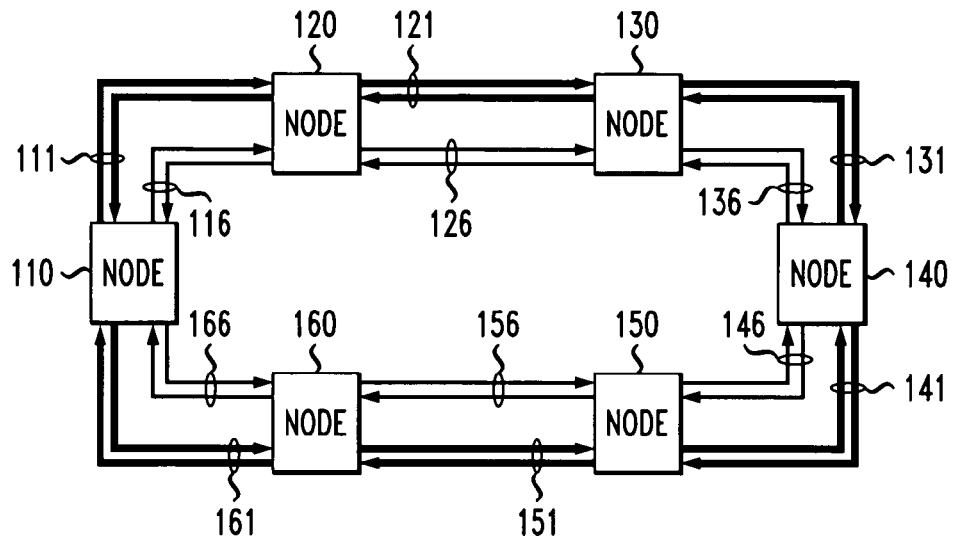
FIG. 1 is an exemplary embodiment of a fully provisioned SONET ring network.

FIG. 1 shows an exemplary embodiment of a fully provisioned SONET ring network 100. The fully provisioned SONET ring network 100 includes a plurality of nodes connected in a ring structure. As shown in FIG. 1, the exemplary ring structure includes nodes 110–160. Although FIG. 1 shows an exemplary ring structure with a particular number of nodes, it should be appreciated that the ring structure can include any number nodes consistent with existing ring standards.

As shown in FIG. 1, each node is connected to adjacent nodes by bi-directional interfaces. Service links 111–161 carry service traffic in a bi-directional manner and are provisioned across every span of the SONET ring. In addition, the protection links 116–166 carry protection traffic in a bi-directional manner and are provisioned across every span of the SONET ring. Thus, there are two closed loops around the ring of service capacity and protection capacity.

The nodes 110–160 can be any known or later developed mechanism for receiving and transmitting information over their respective links 111–166. The nodes 110–160 can be any one of a number of different types of nodes, such as SONET terminals, digital cross-connect systems (DCS), add/drop multiplexers (ADM's), asynchronous transfer mode (ATM) switches, satellites, computers, routers, or any combination of software and hardware capable of generating, relaying, recalling from storage any information capable of being transmitted to the network 100 without departing from the spirit and scope of the present invention. However, for the examples below, the nodes 110–160 are add/drop multiplexers (ADM's).

The links 111–166 can be any known or later developed devices or systems for transmitting data between the plurality of nodes 110–160. Such devices include fiber-optic cable connections and dense wave division multiplexer (DWDM) connections. In general, the links 111–166 can be any known or later developed connected systems, computer programs or structures usable to connect the nodes 110–160 in a ring structure.

Communication paths within the SONET ring structure 100 can occasionally fail. Upon such failures, the SONET ring network 100 can quickly self-repair by establishing new internal communication paths. The restoration process starts as a node 110–160 detects a fault using fault detection devices situated at the node or elsewhere. Upon detection of a problem, the SONET ring network 100 reroutes communication according to a predefined protocol. Under this protocol, if the fault is detected on a service link and the corresponding protection link is available, then communication is diverted from the service link to the protection link, thereby restoring communication. However, if there is a complete span failure somewhere within the path, the traffic can be looped back onto the protection ring by the node detecting the problem, and traverse an alternate path in the opposite direction.

Figure 2:
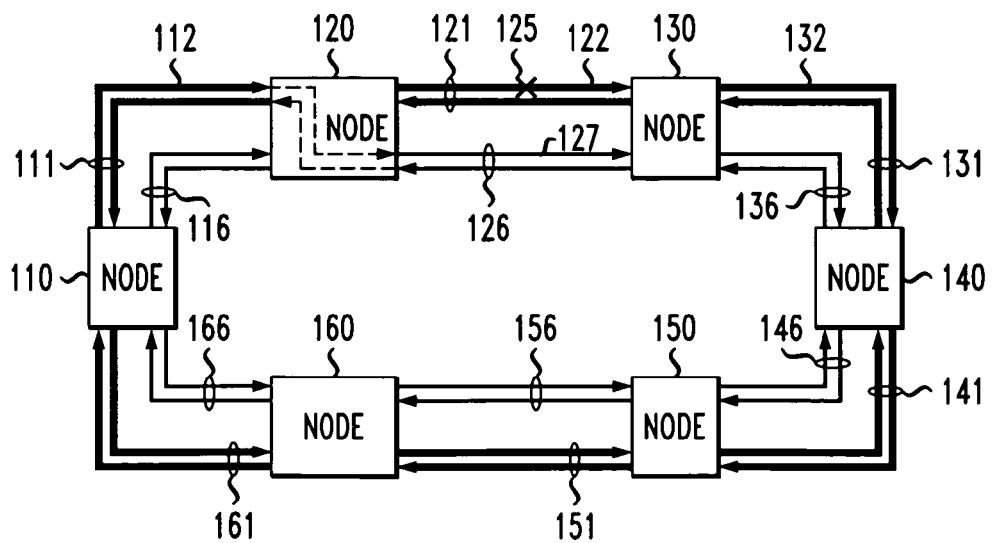
FIGS. 2–3 illustrate various fault situations for the exemplary fully provisioned SONET ring shown in FIG. 1.

FIG. 2 shows an exemplary embodiment of a fully provisioned SONET ring network 100 experiencing a service fault. As shown in FIG. 2, a service fault 125 exists between nodes 120 and 130. This fault condition 125 prevents service traffic from being reliably transmitted between nodes 120 and 130. However, by rerouting the service traffic between nodes 120 and 130 to the protection link 126, the network can self-repair.

For example, it might be desirable to transmit a message from node 110 to node 140 of this network 100. In normal operation, the message might be added to traffic at node 110, transmitted along the service line 112 to node 120, then along the service line 122 to node 130, and finally along the service line 132 to node 140. The message could thereupon be dropped at node 140. However, in this example, where a service fault 125 exists between nodes 120 and 130, the traffic on service link 111 must be switched to protection link 126 and this message can travel along protection line 127 to avoid the fault 125. In this manner, this message can be transmitted reliably between nodes 110 and 140 even though there is a service fault.

Figure 3:
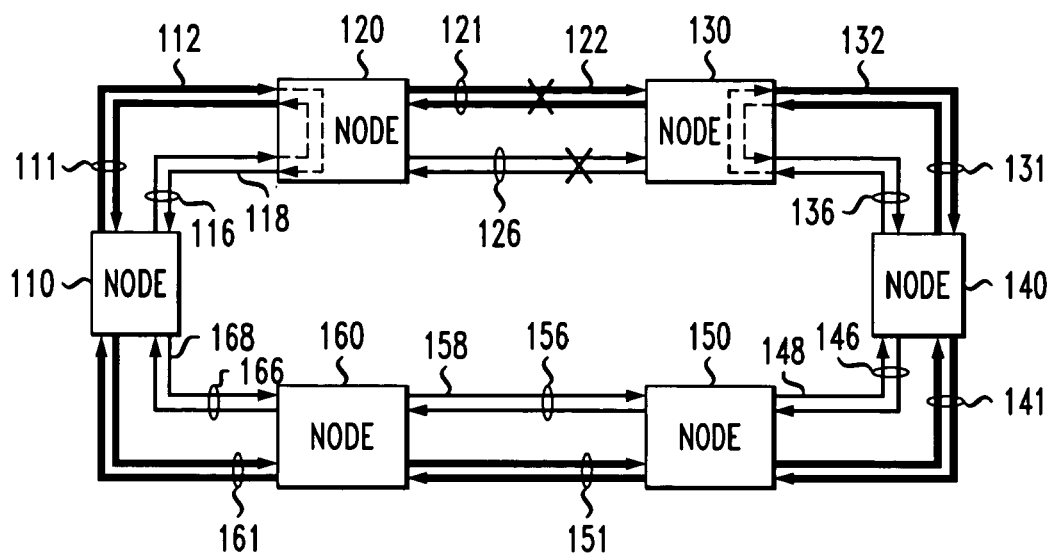

FIG. 3 shows the exemplary embodiment of a fully provisioned SONET ring network 100 experiencing a complete span failure (e.g., a fiber cut, a node failure). As shown in FIG. 3, a complete span failure exists between node 120 and node 130. When a complete span failure is detected, service traffic is diverted to the protection ring and then looped back.

As discussed above, a message can be added to traffic at a particular node and then dropped at the destination node. For example, if a message is to be transmitted from node 110 to node 140 of the network, the message can be added to traffic at node 110 and, for example, traverse the path from node 110 along service line 112 to node 120, then from node 120 along service line 122 to node 130, and finally from node 130 along service line 132 to node 140. However, if there is a complete span failure somewhere within this path, the traffic can be looped back onto a protection link by the node detecting the problem, and traverse an alternate path in the opposite direction.

For example, assume a message is to be transmitted from node 110 to node 140 but that a complete span failure exists between node 120 and node 130. In this example, the traffic can be looped back at node 120 (where the fault is detected), and redirected to the protection link 116 and thereafter traverse the alternate path from node 120 along protection line 118 to node 110, then from node 110 along protection line 168 to node 160, from node 160 along protection line 158 to node 150, and finally from node 150 along protection line 148 to node 140. In this manner, the ring structure can provide the necessary linkage restoration to ensure reliability and the message can arrive at the desired destination node.

Figure 4:
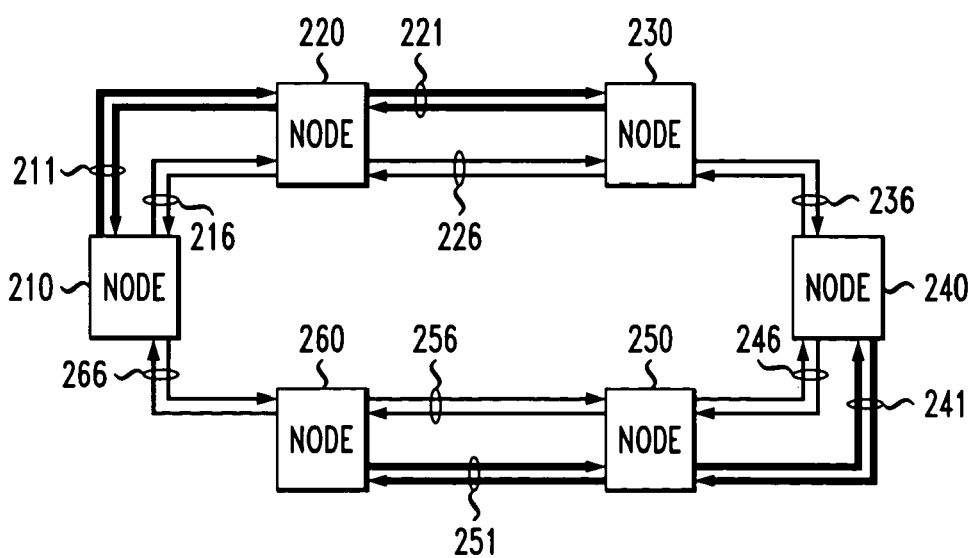
FIG. 4 is an exemplary embodiment of a partially provisioned SONET ring network.

FIG. 4 shows an exemplary partially provisioned SONET ring network 200. The exemplary partially provisioned SONET ring network 200 includes a plurality of nodes connected in a ring structure. As shown in FIG. 4, the exemplary ring structure includes nodes 210–260. The exemplary partially provisioned SONET ring network 200 allows a ring to be provisioned without a continuous loop of service capacity around all legs of the ring. This allows for the postponement of providing service capacity until a demand requires it. Only protection capacity is required to close the loop, and the decision to add working capacity can be decided on a link-by-link basis. Moreover, the ring can continue to meet the same performance requirements as before.

In general, a message can be transmitted along any path for which service has been provisioned. Thus, as shown in FIG. 4, service traffic may be transmitted from node 210 to node 230 and from node 240 to node 260 because service links 211, 221, 241 and 251 exist along these paths. However, since the path between node 230 and 240 is not provisioned with service capacity, service traffic cannot be transmitted from node 230 to node 240 (in either direction) unless, of course, the protection fibers are used for data traffic that may be pre-empted in case of a fault.

The exemplary partially provisioned SONET (PPSONET) ring network 200 requires several changes to the conventional approach. In particular, a new ring capacity management capability is required to provision the protection channels only, and to add or delete service channels as needed on any specific span of the ring. In general, as far as the ring-switching protocols are concerned, the unprovisioned service channels can act as if they are in a normal state, without any signal fail or signal degrade conditions. Thus, standing alarms are not generated for spans that have only protection capacity. Traffic can be routed on the provisioned service channels and extra traffic for pre-emptable demands can still be routed on the protection channels even when there is no corresponding service channel. Additionally, on spans that do not have the service channel provisioned, the data communication channel (DCC) can be routed on the protection channel. Furthermore, messages sent along a path to verify the integrity of the path (e.g., k-byte messages) will be sent on the protection links.

Figure 5:
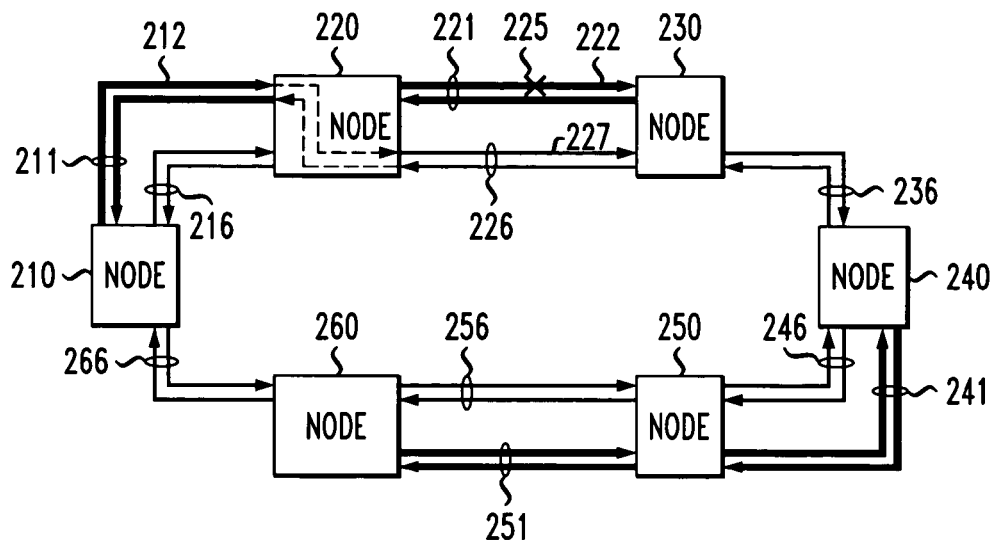
FIGS. 5–6 illustrate various fault situations for the exemplary partially provisioned SONET ring shown in FIG. 4.

FIG. 5 shows the exemplary PPSONET ring network 200 experiencing a service fault 225. As shown in FIG. 5, the fault condition 225 prevents traffic from being reliably transmitted in the easterly direction between nodes 220 and 230. However, by rerouting the service traffic to the protection link 226 to avoid fault 225, the network can self-repair. The restoration process is similar to the conventional approach taken by the exemplary fully provisioned SONET ring network 100.

Traffic can be rerouted from a service link to a protection link when a fault condition is detected. Normally, for example, if a message is to be transmitted from node 210 to node 230, the message can be added to traffic at node 210, transmitted along service line 212 to node 220, then from node 220 along service line 222 to node 230, where the message can be dropped. However, if at node 220 a service fault 225 is detected, traffic on service link 211 can be switched to protection link 226 and this message can travel along protection line 227 to avoid the fault 225. In this manner, a PPSONET ring network can provide the same level of tolerance for service faults as before.

Figure 6:
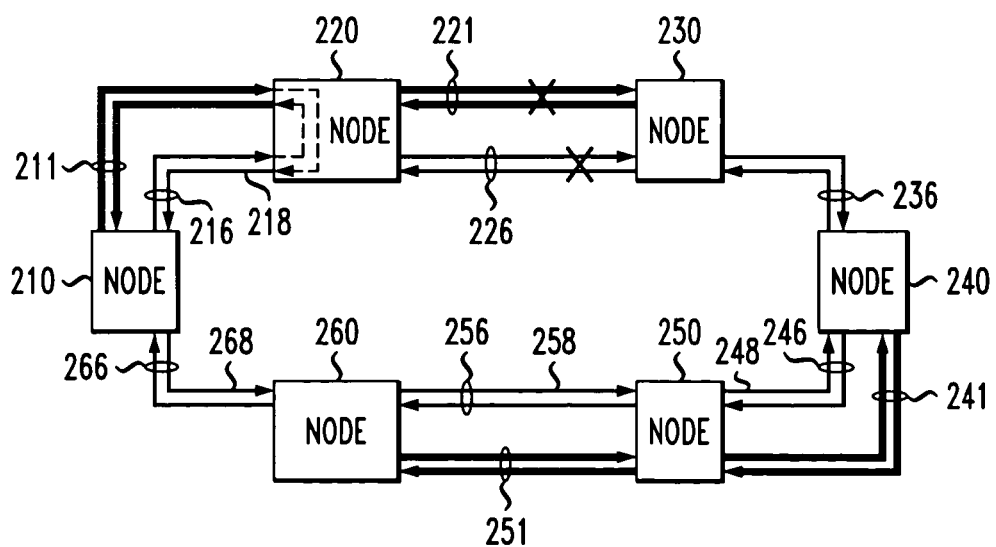

FIG. 6 shows an exemplary PPSONET ring network 200 experiencing a complete span failure. As shown in FIG. 6, there is a complete span failure between nodes 220 and 230 of this network 200. However, even in this catastrophic situation, the PPSONET ring network 200 can provide the necessary linkage restoration.

In operation, a message can be transmitted along any path of the exemplary PPSONET ring network 200 for which service has been provisioned. Thus, as shown in FIG. 6, service traffic can be transmitted from node 210 to node 230 and from node 240 to node 260. However, since the path between nodes 230 and 240 is not provisioned, service traffic cannot be transmitted from node 230 to node 240.

If it is desirable to transmit a message from node 210 to node 230, for example, the message normally can be added at node 210 and transmitted to node 230 where it can be dropped. However, if there is a complete span failure between node 220 and node 230, then traffic can be rerouted by node 220 (where the fault is detected) to the protection link 216 and looped back. In this manner, a message that is sent from node 210 to node 230 can be transmitted to node 230 even though there is a complete span failure.

In this example, the message can be looped back at node 220 and travel from node 220 along protection line 218 to node 210, from node 210 along protection line 268 to node 260, from node 260 along protection line 258 to node 250, and finally from node 250 along protection line 248 to node 240. As can be seen, so long as all legs of the ring are provisioned with protection capacity, the loopback routine can be used. Thus, it is not necessary to fully provision the ring with service capacity in order to enjoy the benefits of a high-reliability ring structure so long as all legs of the ring are provisioned with protection capacity.

Figure 7:
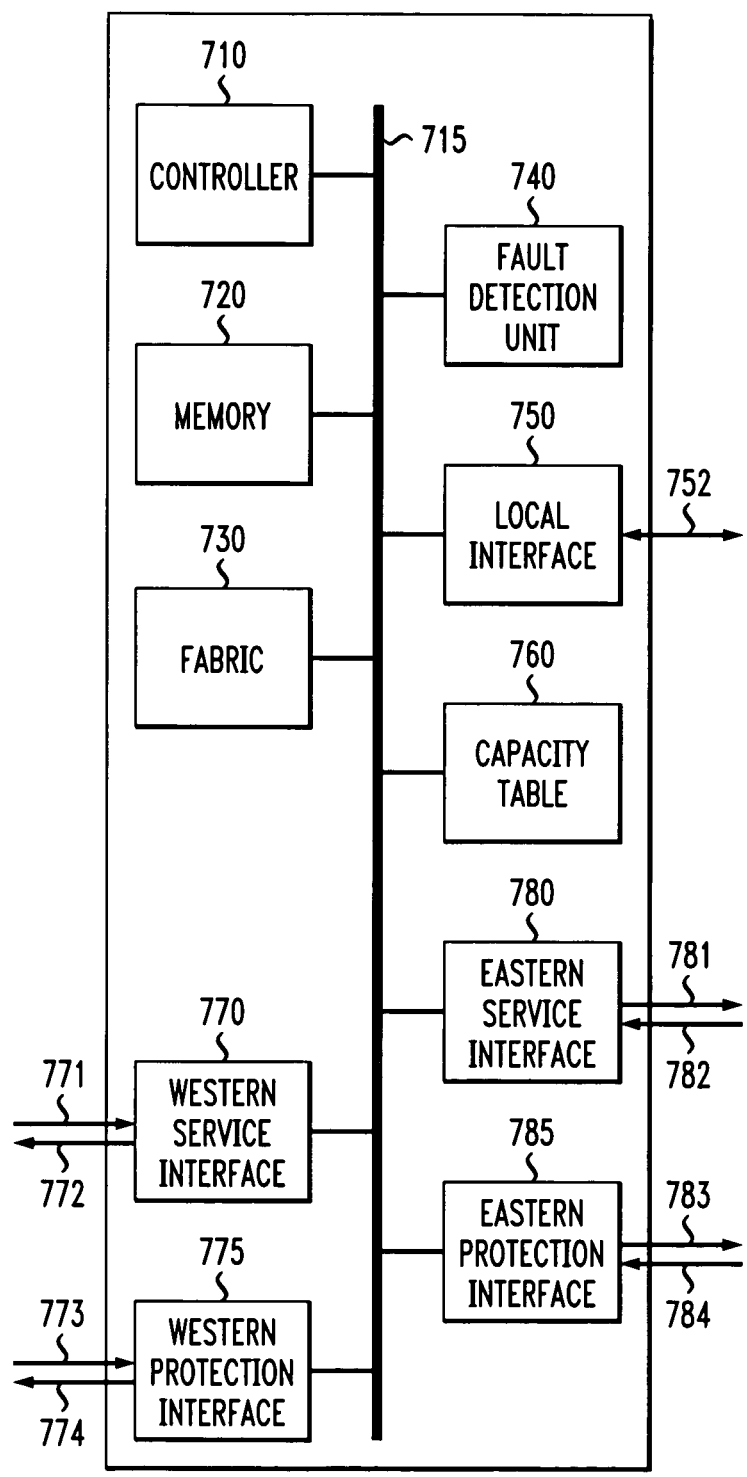
FIG. 7 is block diagram of an exemplary node.

FIG. 7 is a block diagram of an exemplary node 700. The exemplary node 700 has a controller 710, a memory 720, a fabric 730, a fault detection unit 740, a local interface 750, a capacity table 760, a western service interface 770, a western protection interface 775, an eastern service interface 780, and an eastern protection interface 785. The controller 710 is linked to the other devices 720 to 785 by the data/control bus 715. While FIG. 7 shows a bus architecture, any type of architecture may be used and implemented using any type of technology such as application specific integrated circuits (ASIC), PLAs, PLDs, etc. as is well known to one of ordinary skill in the art.

In various exemplary embodiments, not all nodes of the ring structure need to be provisioned with service capacity. For each node, the capacity table 760 can have entries indicating the particular provisioning of the node. For example, if the eastern service interface 780 is not provisioned with service capacity, an entry that this service interface is unprovisioned can be made in the capacity table 760. It should be appreciated that the information in the capacity table 760 relating to the provisioning of the node can be changed as decisions are made to add/delete service capacity.

Generally, as far as the ring-switching protocols are concerned, the unprovisioned service channels can act as if they are in a normal state, without any signal fail or signal degrade conditions. Thus, standing alarms are not generated for spans that have only protection capacity. Traffic can be routed on the provisioned service channels and extra traffic for pre-emptable demands can still be routed on the protection channels even when there is no corresponding service channel. Additionally, on spans that do not have the service channel provisioned, the data communication channel (DCC) will be routed on the protection channel. Furthermore, messages sent along a path to verify the integrity of the path (e.g., k-byte messages) will be sent on the protection links.

In a first mode of operation, data continuously flows into the node 700 through the various interfaces 770, 775, 780 and 785. The fabric 730 can drop any portions of this tributary data that are to be dropped at the node and output this data via the local interface 750 to external devices (not shown) via link 752. In addition, the fabric 730 can add data received through the local interface 750. This added data would be sent by the fabric 730 to the appropriate interface to be routed to the "next node" in the ring structure. While the exemplary fabric 730 is essentially an optical device, it should be appreciated that the fabric 730 can be a purely electrical switching device accommodated by electrical-to-optical and optical-to-electrical transducers or the fabric 730 can be any combination of optical and electrical technologies without departing from the spirit and scope of the invention.

Ordinarily, the received information would be directed to the next node of the ring adjacent to the present node. For example, if data arrives via link 771 of the western service interface 770, this data would ordinarily be transmitted via link 781 of the eastern service interface 780 to the node connected to this link 781 (unless, of course, it is to be dropped at the present node). If the traffic patterns require a service interface that is not currently provisioned, then a provisioning operation is required to create the appropriate service interface and keep track of it in the capacity table 760.

The controller 710 interacts with the fault detection unit 740 to determine whether any fault condition exists between the present node and the next node. The types of error conditions that can be measured by the fault detection unit 740 include single bit errors, octet errors, cyclic redundancy check (CRC) errors, checksum errors, framing errors and loss of signal errors. However, as communication standards evolve and new standards develop, it should be appreciated that any error condition or failure capable of being measured can be used without departing from the spirit and scope of the present invention.

If the fault detection unit 740 detects a fault, the controller 710 can suspend the transmission of certain non-critical types of data, such as non-critical communications that may be retransmitted if lost, network status messages, and best-effort type of communications. However, if the type of data to be transmitted is not pre-emptable, then the controller 710 proceeds with linkage restoration. If the fault condition indicates that a service fiber is not usable but the corresponding protection fiber is available, then controller 710 directs transmittal of the information to the next node of the ring but along the protection link instead of the service link. In the event that the fault detection unit 740 determines that there is a complete span failure, controller 710 directs the information to the prior node of the ring in the opposite direction along the protection link.

Figure 8:
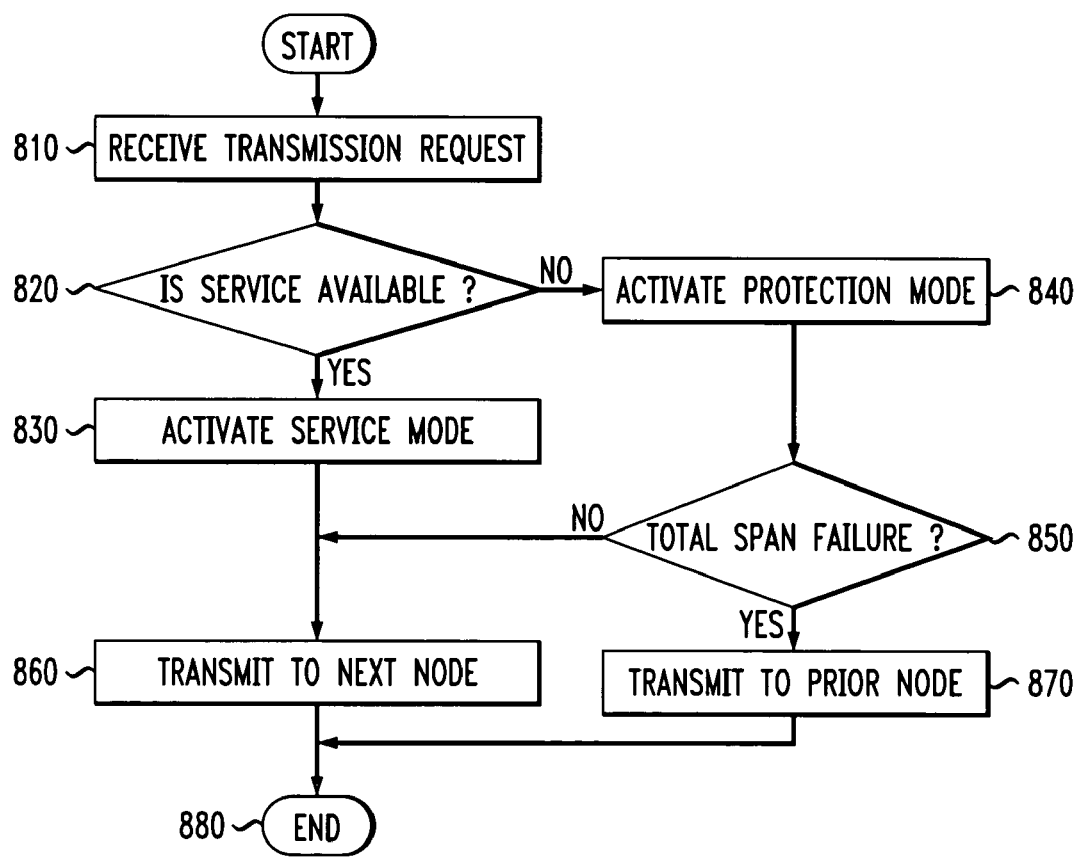
FIG. 8 depicts a flowchart outlining an exemplary technique for providing linkage restoration.

FIG. 8 depicts a flowchart outlining an exemplary embodiment of a technique for providing a fault-tolerant ring structure. Beginning at step 810, a transmission request is received indicating that information is to be transmitted to another node.

In step 820, a determination is made as to whether a service fiber is available to transmit the information. In order to determine whether service is available, a capacity table can be queried to determine whether the service capacity is provided. Assuming that service capacity is provided, the node can then check for a service fault condition. If service is provisioned and no fault has been detected (i.e., service is available), control continues to step 830; otherwise, control continues to step 840.

In step 830, the service mode is activated. Once the service mode is activated, any information that is thereafter transmitted is on the service fiber. Control continues to step 860. Next, in step 860, the information can be transmitted along the service fiber to the next node of the ring structure.

However, if service is not available, then the protection mode is activated in step 840. Next, in step 850, a determination is made as to whether there is a complete span failure (e.g., a fiber cut, a node failure). If there is not a complete span failure, then control passes to step 860 where the information is transmitted along the protection fiber to the next node of the ring. However, if there is a complete span failure, then control passes to step 870 where a ring loop-back function operates to transmit the information along the protection fiber to the prior node of the ring. Control continues to step 880 where the operation stops.

While this invention has been described in conjunction with the exemplary embodiments outlined above, it is evident that many alternatives, modifications and variations of the invention, as set forth above, are intended to be illustrative, and not limiting. Various changes may be made without departing from the spirit and scope of the invention.

What is claimed is:

1. A method, comprising:
   for transmitting and receiving customer data in a fault-tolerant ring network comprised of a plurality of nodes with adjacent pairs of nodes linked by at least one of a service link and a protection link, with at least a first and second adjacent nodes only linked by a protection link, transmitting and receiving a first type of data using only service links when the network is in a no-fault condition; and transmitting and receiving the first type of data using at least one protection links when the network is in a fault condition.

2. The method of claim 1, further comprising:

transmitting and receiving a second type of data using the protection links when the network is in a no-fault condition; and suspending transmission of the second type of data over one or more of the protection links when the network is in a fault condition.

3. The method of claim 2, wherein the second type of data includes pre-emptable data.

4. A method for communication among nodes of a fault-tolerant ring network, comprising:

dividing the nodes into groups comprising a first group linked to a second group only by a predetermined protection link;

dividing traffic into a first type of data and a second type of data;

communicating the first type of data between two or more nodes; and communicating the second type of data between nodes of different groups.

5. The method of claim 4, further comprising:

communicating the first type of data between nodes of different groups when a fault is detected in the network; and suspending communications of the second type of data between nodes that are adjacent to the fault.

6. A method comprising:

for operating an end node of a group of a plurality of groups of contiguous nodes in a fault-tolerant ring network, the end node being one of two nodes in the group that is adjacent to only one other node of the group:

transmitting and receiving a first type of data to and from the other node when a fault is not detected; and transmitting and receiving the first type of data to and from an end node of an adjacent group when the fault is detected.

7. The method of claim 6, further comprising:

transmitting and receiving a second type of data to and from the end node of the adjacent group when the fault is not detected; and suspending transmission and reception of the second type of data to and from the end node of the adjacent group when the fault is detected.

8. The method of claim 7, wherein the second type of data includes pre-emtable data.

9. The method of claim 6, wherein the fault is not caused by a failed switch.

10. A fault-tolerant ring network of nodes, comprising:

protection links between all pairs of adjacent nodes of the ring network;

two or more groups of contiguous nodes of the ring network; and service links between two or more adjacent nodes of the ring network, but not between adjacent nodes of different groups.

11. The network of claim 10, wherein a first type of data is transmitted and received using only the service links when the network is in a no-fault condition, and using one or more of the protection links when the network is in a fault condition.

12. The network of claim 11, wherein a second type of data is transmitted and received using the protection links when the network is in a no-fault condition, and transmission of the second type of data is suspended over one or more of the protection links when the network is in a fault condition.

13. The network of claim 12, wherein the second type of data includes pre-emptable data.

14. The network of claim 10, wherein a first type of data is transmitted and received using only the service links when the network is in a no-fault condition, and using one or more of the protection links when the network is in a fault condition, wherein the fault condition is not caused by a failed switch.

15. The fault-tolerant ring network of claim 10, wherein said fault-tolerant ring network is a Sonet network.

16. The fault-tolerant ring network of claim 10, wherein at least one node is a Sonet terminal.

17. The fault-tolerant ring network of claim 10, wherein at least one of the nodes comprises a digital cross-connect system.

18. The fault-tolerant ring network of claim 10, wherein at least one service link comprises fiber-optic cable.

19. A fault-tolerant ring network, comprising:

a plurality of nodes divided into groups comprising a first group and a second group linked only by a predetermined protection links, wherein a first type of data is communicated between at least two of the nodes, and a second type of data is communicated between the first group and the second group.

20. The network of claim 19, wherein the first type of data is communicated between nodes of different groups when a fault is detected in the network and communications of the second type of data between nodes that are adjacent to the fault is suspended.

* * * * *